United States Patent
Hoveman

[11] 3,820,011
[45] June 25, 1974

[54] FLUID IMMERSION CONDUCTOR INSULATION TESTER

[75] Inventor: Derek Charles Hoveman, Kenley, England

[73] Assignee: International Standard Electric Corporation, New York, N.Y.

[22] Filed: May 3, 1973

[21] Appl. No.: 356,854

[30] Foreign Application Priority Data
Aug. 18, 1972 Great Britain.................. 23434/72

[52] U.S. Cl................................................. 324/54
[51] Int. Cl.......................................... G01r 31/16
[58] Field of Search.......................... 324/54, 61 P

[56] References Cited
UNITED STATES PATENTS

| | | |
|---|---|---|
| 2,485,871 | 10/1949 | Entwistle .......................... 324/54 |
| 2,794,169 | 5/1957 | Gooding .......................... 324/54 |
| 2,804,592 | 8/1957 | Biskeborn.......................... 324/61 P |
| 3,134,071 | 5/1964 | Wakefield.......................... 324/54 |
| 3,310,735 | 3/1967 | Peschel.............................. 324/54 |
| 3,349,324 | 10/1967 | Wakefield.......................... 324/54 |
| 3,612,994 | 10/1971 | Hooper.............................. 324/54 |

*Primary Examiner*—Gerard R. Strecker
*Attorney, Agent, or Firm*—John T. O'Halloran; Menotti J. Lombardi, Jr.; Edward Goldberg

[57] ABSTRACT

An electrode plate in the form of a V-shaped laminated trough is used for immersion testing of insulation around an electrical conductor. The center of the electrode is of bare metal while the other portions are insulated. The trough is filled with water through which the insulated wire conductor is passed. Voltage is applied between the electrode and ground via a lead connection at one end with the conductor being grounded at the extrusion machine. Pin holes in the insulation are detected by conduction between the wire conductor and electrode plate through the water.

5 Claims, 3 Drawing Figures

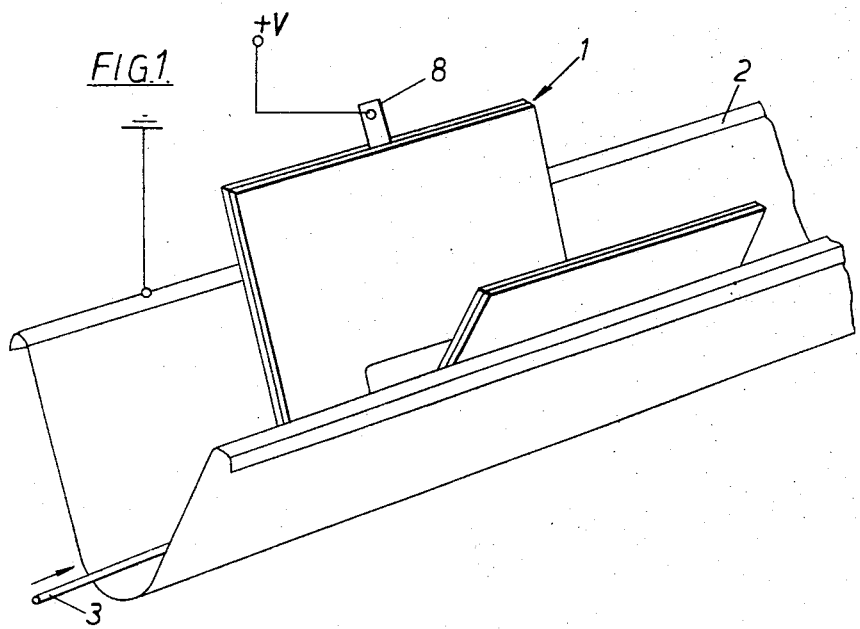
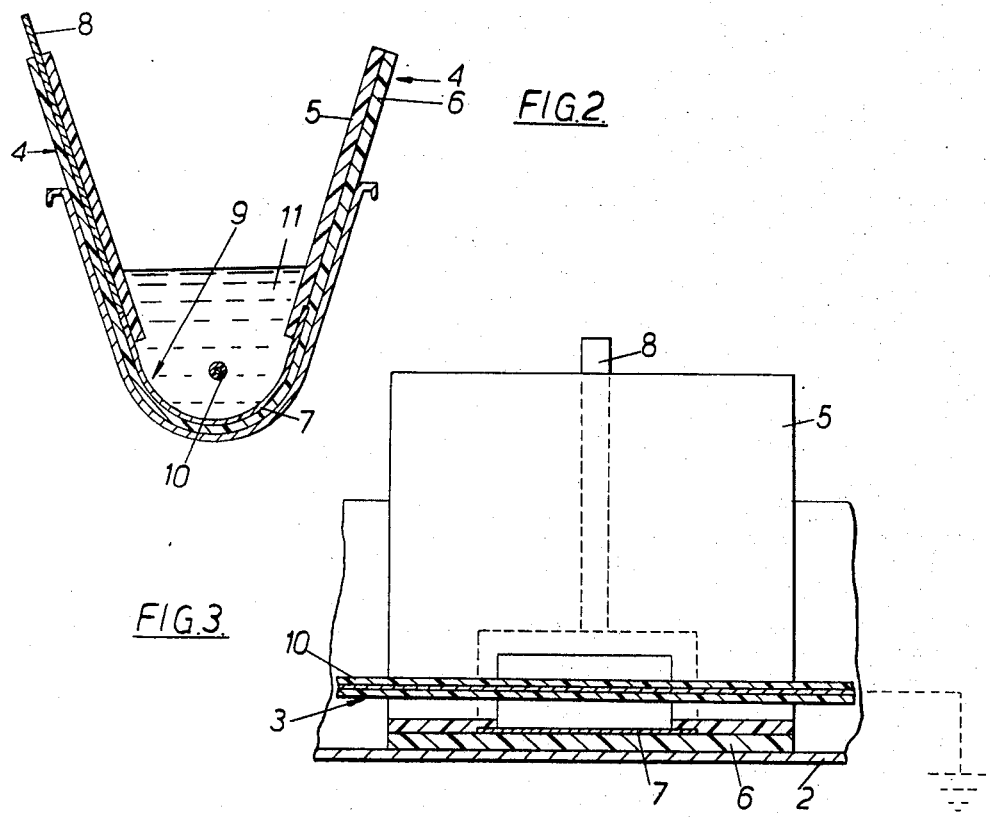

FLUID IMMERSION CONDUCTOR INSULATION TESTER

BACKGROUND OF THE INVENTION

1. Field of the Invention

This invention relates to low voltage electrical cable testers for the detection of pin hole faults in the plastics insulation on insulated electrical conductors and, in particular, to electrodes for use therein.

2. Description of the Prior Art

In U.S. Pat. No. 3,612,994, issued Oct. 12, 1971 and assigned to the same assignee as the instant application, there are described insulation testers which utilize voltages of the order of 50 to 600 volts. These operating voltages were low in comparison with the then known testers, which used voltages of the order of 6 to 10 KV. The insulation tester in this prior patent utilized an annular electrode.

It is an object of the present invention to provide a simplified, less costly, improved form of electrode for an insulation tester which can utilize substantially reduced voltage.

SUMMARY OF THE INVENTION

According to the present invention there is provided an electrode for use in connection with an insulation tester for detecting pin hole faults in the insulation of a plastics-insulated electrical conductor. The electrode is positioned in a cooling trough, through which the plastics insulated conductor normally passes following the extrusion of the plastics insulation over the conductor. The electrode includes a metal plate of a generally V-shaped cross-section such that the insulated conductor, which is connected to ground at the extrusion machine, passes between the arms of the V in water contained in the cooling trough. Means are provided to connect a constant voltage D.C. supply to the metal plate.

Embodiments of the invention will now be described with reference to the accompanying drawings.

BRIEF DESCRIPTION OF THE DRAWINGS

FIG. 1 shows a view of an embodiment of an electrode according to the present invention positioned within a cooling trough;

FIG. 2 shows a central transverse section through the electrode and water trough of FIG. 1, the trough being filled with water; and FIG. 3 shows a longitudinal section through the electrode and trough of FIG. 1.

DESCRIPTION OF THE PREFERRED EMBODIMENT

By using a shape of an electrode having a generally V-shaped cross-section, the required operating voltage of the prior art can be reduced still further to, for example, 7 volts, and this is obviously preferable from an operating standpoint.

Referring now to the drawings, in FIG. 1 there is shown a view of a generally V-shaped electrode 1 positioned in a cooling trough 2 shich contains water for cooling the plastics insulation extruded, during manufacture of the insulated conductor 3, over a bare conductor. The insulated conductor 3 is fed immediately into the trough 2 following extrusion of the plastics insulation in an extruding machine (not shown), and passes between the arms of the generally V-shaped electrode 1, as can be seen more clearly in FIGS. 2 and 3.

The electrode 1 has a transverse cross-section as shown in FIGS. 2 and 3 which in this Specification is referred to as "generally V-shaped." It is, in fact, substantially a V with a rounded base, and is, therefore, somewhat parabolic in shape. The sides 4 of the electrode 1 are, for example, at an angle of approximately 30° to the vertical as shown. The electrode 1 has a laminated structure and comprises two layers 5 and 6 of an insulating material, for example, rubber, polyvinyl chloride, perspex, polystyrene or cellulose acetate, between part of which is sandwiched a conductive metal plate or layer 7, which may, for example, be of brass or aluminum. The metal layer 7 is of substantially smaller area than the layers 5 and 6, and is placed substantially centrally with respect thereto. The layers 5 and 6 are stuck together with the layer 7 sandwiched as shown. A connection lead 8 extends from the layer 7, as shown, between the layers 5 and 6. A portion of the inner-most insulating layer 5 is cut away as shown to provide a window 9 exposing the metal layer 7 on its side which will, in use, face the insulated conductor 3.

In use the electrode 1 is positioned in the water trough 2 as shown, the latter being grounded, and the electrode connection 8 is connected to a constant voltage D.C. supply of, for example, 7 volts. The conductor of the insulated conductor 3 is taken to ground potential by means provided on the extruding machine before the insulation 10 is applied. Depending on the conductivity of the water 11 (FIG. 2) used in the cooling trough 2, the voltage between the conductor and the electrode is between 6½ and 7 volts.

An actual testing circuit used in connection with the generally V-shaped electrode described above, does not form part of the present invention and will not be particularly described herein. Those testing circuits described in the aforementioned patent are obviously suitable, but others may alternatively be used.

The basic operation of the electrode and its associated test circuit is as follows. Under normal conditions, when the cable insulation is fault-free, no discharge takes place between the electrode layer 7 and ground via the cooling water and the cable conductor. When there is a fault in the extruded insulation, such as a pin hole, the electrode will discharge to ground down the cable core via the cooling water. The testing circuit may incorporate means, for example, for detecting when a discharge occurs, counting and recording the number of discharges, and indicating the occurrence of the faults to an operator by illuminating lamps or sounding alarms, etc.

The generally V-shaped electrode of the present invention has the following advantages over the previously used annular electrodes, apart from using lower voltages. It is simple to manufacture, install and operate; the insulated conductor does not have to be threaded through it as in the case of an annular electrode; it provides a reduction in hydrodynamic drag, which is particularly useful in connection with high speed extrusion machines, and it is more sensitive to the detection of pin hole faults.

What is claimed is:

1. A fluid immersion insulation tester for detecting pin hole faults in a plastics-insulated electrical conductor comprising a trough adapted to contain a cooling fluid and to receive a plastics insulated conductor drawn through said fluid following the extrusion of the plastics insulation over the conductor, said trough including a generally V-shaped cross-section laminate structure having two layers of insulating material and a metal plate electrode positioned between said two layers such that the insulated conductor passes between the arms of the V immersed in said fluid, one of said layers having an opening along the center portion exposing a portion of the metal plate to said fluid, said exposed portion facing said insulated conductor in said trough, and means for connecting a constant direct voltage supply between said metal plate and conductor, said fluid providing a conduction path for direct current between said metal plate and conductor upon the occurrence of a pin hole fault in said plastics insulation of said conductor.

2. The device of claim 1, wherein the insulating material layers of the laminate are of a larger surface area than the metal plate, said plate being positioned substantially centrally with respect thereto, and including a direct voltage connection lead extending between said two insulating layers and connected to said metal plate.

3. The device of claim 2, wherein said means connecting a direct voltage includes a ground connection to said conductor.

4. The device of claim 3, wherein said trough includes an outer metal container supporting said laminate structure, and a ground connection to said outer container.

5. The device of claim 4, wherein said insulating material is of the group consisting of rubber, polyvinyl chloride, perspex, polystyrene and cellulose acetate.

* * * * *